Aug. 1, 1961  E. R. SEWELIN ET AL  2,994,556
MOTOR VEHICLE END GATE CONSTRUCTION
Filed Nov. 23, 1959  4 Sheets-Sheet 1
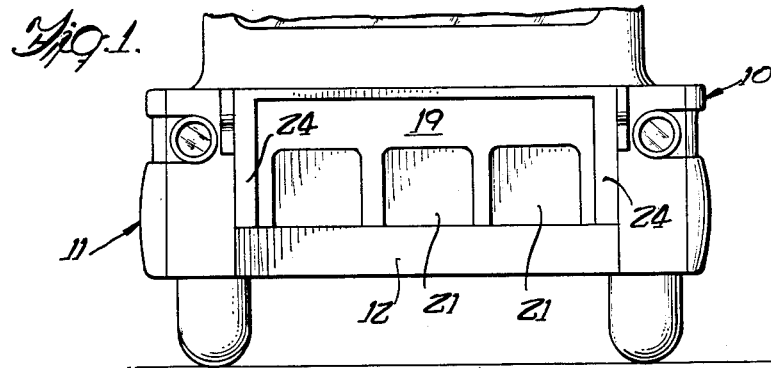
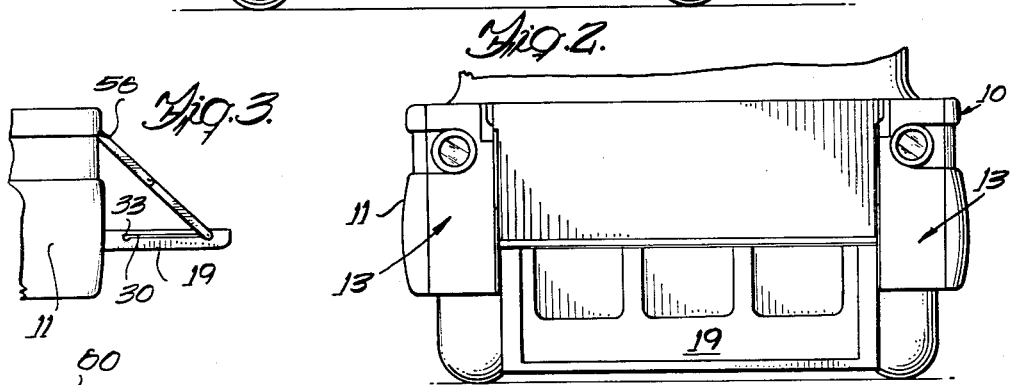
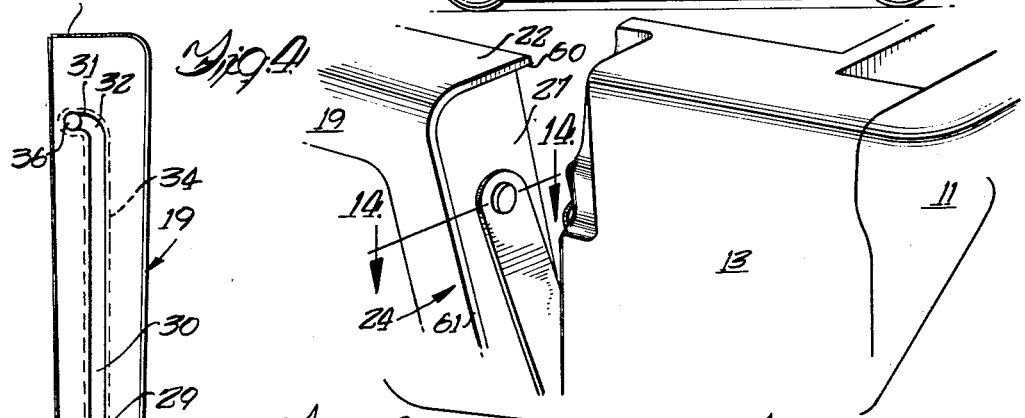
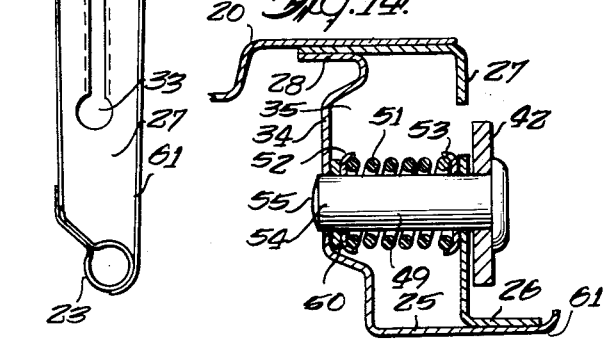
INVENTORS
ERNEST R. SEWELIN
DONALD B. STUDY
ATTORNEY

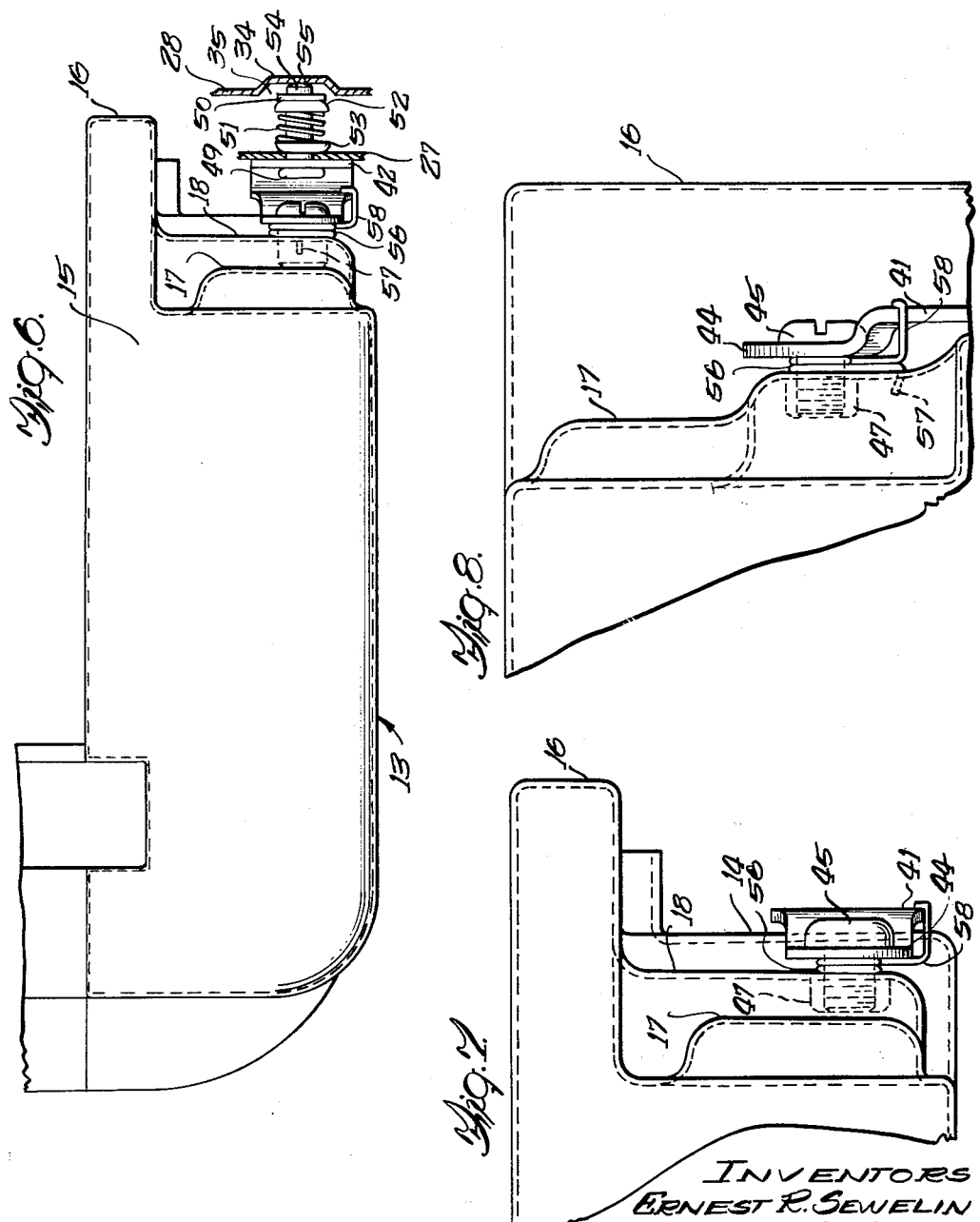

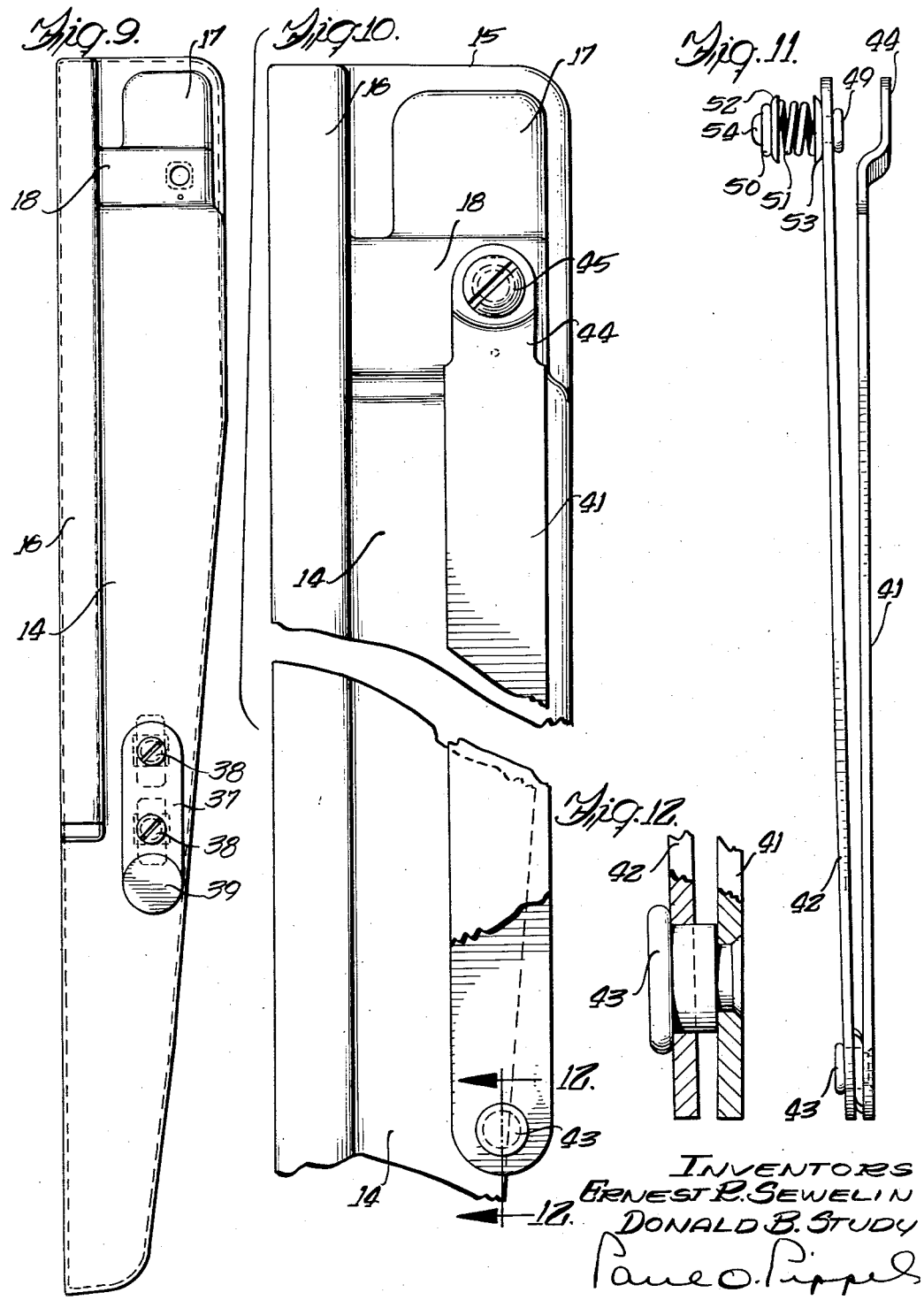

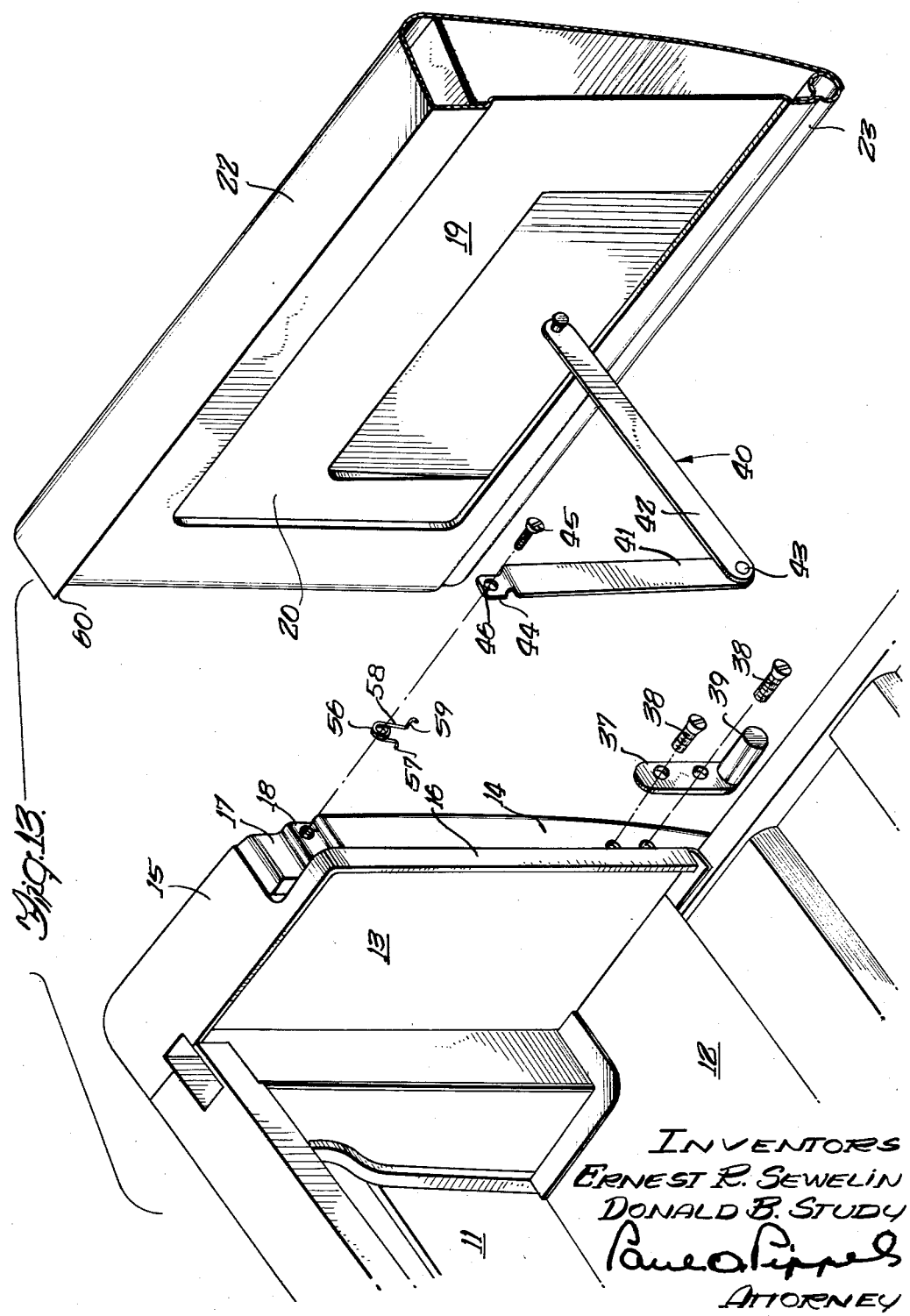

United States Patent Office 2,994,556
Patented Aug. 1, 1961

2,994,556
MOTOR VEHICLE END GATE CONSTRUCTION
Ernest R. Sewelin, Waterloo, and Donald B. Study, Fort Wayne, Ind., assignors to International Harvester Company, Chicago, Ill., a corporation of New Jersey
Filed Nov. 23, 1959, Ser. No. 854,690
14 Claims. (Cl. 296—57)

This invention relates to a motor vehicle body construction and more particularly to a new and improved mounting means for the end gate of a pickup type motor truck body.

It is the common practice in the manufacture of pickup type bodies to provide an end gate structure for the open rear end of the body which may be swung about a horizontal laterally extending axis from a vertical upright position wherein the rear end of the body is closed to a rearwardly extending horizontal open position or alternately to an open position wherein the end gate hangs vertically with respect to the truck body floor or bed. In order to support the end gate in its open rearwardly extending position wherein the end gate in effect forms a continuation of the truck body floor or bed flexible means such as chains or the like extending between the truck body and the end gate are generally employed. Consequently when the end gate is in any position other than the position where the end gate is extending rearwardly and the chains or other support means are taut the chains rattle during operation of the motor truck.

Furthermore, when it was desired to adjust the position of the end gate it was necessary to manually disconnect or connect the chains from or to the end gate. Inasmuch as the chains or other supporting means are disposed to the elements oftentimes after long periods of use it is difficult to connect and reconnect the chain to effect different positioning of the end gate.

In recent years the designers of truck manufacturers have strived to improve the appearance of motor trucks and especially the bodies of pickup type trucks. Obviously, supporting chains or other supporting means heretofore employed in conjunction with end gates render the pickup body unattractive, especially when the end gate is in its closed position.

It is therefore a primary object of the present invention to provide improved end gate supporting means for a pickup type body motor truck which eliminates the various short-comings enumerated above of prior end gate supporting means and which are strong, durable and simple and not likely to get out of order.

A still further object is the provision of an end gate supporting means for a pickup type truck body wherein the supporting means is substantially enclosed when the end gate is in its upright closed position.

Still another object is the provision of an end gate supporting means which is simple to operate and does not require a manual connection or disconnection of the supporting means to effect adjustment of the end gate and which will not rattle during operation of the motor vehicle regardless of the position of the end gate.

The foregoing and other important objects and desirable features inherent in and encompassed by the invention, together with many of the purposes and uses thereof will become readily apparent from a reading of the ensuing description and annexed drawings in which:

FIGURE 1 is a rear elevational view of a pickup truck embodying the invention. The end gate is shown in its closed position;

FIGURE 2 is a view similar to FIGURE 1 illustrating the end gate in its lowered open position;

FIGURE 3 is a fragmentary side elevational view showing the end gate in its rearwardly extending horizontal opened position;

FIGURE 4 is an end elevational view of the end gate;

FIGURE 5 is an enlarged fragmentary perspective of the rear end of a pickup truck illustrating the end gate partially open;

FIGURE 6 is a plan view of a portion of the pickup body rear panel;

FIGURE 7 is a view similar to FIGURE 6 with the exception that certain parts shown in FIGURE 6 are removed to better illustrate the invention;

FIGURE 8 is an end elevation view of the structure shown in FIGURE 7;

FIGURE 9 is an elevational view of the pickup body rear panel;

FIGURE 10 is a view similar to FIGURE 9 with the exception that certain parts have been added thereto;

FIGURE 11 is an end elevational view of the hinged links;

FIGURE 12 is an enlarged detail view of the pivot connection between the supporting links;

FIGURE 13 is an exploded perspective view of the end gate and rear portion of the vehicle pick-up body; and FIGURE 14 is a sectional view taken substantially along line 14—14 of FIGURE 5.

Referring to the drawings in detail, wherein like reference characters represent like elements throughout the various views, the rear portion of a pick-up type motor truck body 10 is shown. The body 10 is generally illustrated as having a pair of laterally spaced vertical side panels 11 and a horizontal load supporting floor or bed 12 extending between and suitably connected to the side panels 11. Rigidly fastened to the rearwardmost end of each side panel 11 is a transversely extending rear panel section 13.

The rear panel sections 13 are of a double wall construction and the outer panel of each section 13 is formed to provide an inwardly facing end surface 14. The innermost edge of each rear panel section 13 extending vertically between the floor 12 and the top surface 15 of the section 13 is defined by a transversely extending flange 16. The inwardly facing end wall 14 is depressed outwardly adjacent the top surface 15 of each section 13 to provide a surface 17 lying in a vertical plane parallel to but spaced transversely outwardly from the general plane of the wall 14. The area 18 intermediate the area 17 and the major portion of the end wall 14 is also depressed outwardly from the general plane of the wall 14 and lies in a vertical plane intermediate the vertical planes containing the area 17 and the major portion of the wall 14. The purpose of the depressed areas 17 and 18 will be pointed out hereinafter.

The end gate 19 includes a single metal sheet 20 having a generally rectangular shape. The metal sheet 20 is provided with suitable depressions 21 which serve to rib the end gate and strengthen and rigidify the same. The upper edge of the metal sheet 20 extends horizontally to provide a top surface 22 which is in horizontal alignment with the top surfaces 15 of the rear end panel sections 13 when the end gate 19 is in its closed position, as shown in FIGURE 1. The lower edge of the metal sheet 20 is formed to provide an open ended cylindrical bearing 23. Attached to each lateral edge of the metal sheet 20 is a box-like end member 24 which, as shown in FIGURE 14, includes a pair of Z-shaped elements 25 and 26 welded to each other and the metal sheet 20. One wall 27 of the element 26 lies in a vertical, longitudinally extending plane transversely spaced and substantially parallel to a wall 28 of the element 25. The walls 27 serve as the end faces of the end gate 19.

Each end face 27 of the end gate 19 is provided with an elongated slot 29 therethrough. As best shown in FIGURE 4, each slot 29 is substantially L-shaped with one of the slot leg sections 30 considerably longer than the other leg 31 and extends vertically when the end gate is in its upright or closed position as shown in FIGURES 1 and 4. The relatively short leg slot portion 31 extends substantially horizontally forwardly from the slot section 30 when the end gate is in its upright position. The slot 29 also includes a curved portion 32 which merges into the short leg slot portion 31 and one end of the long leg slot section 30. The end of the long leg slot section 30 opposite the curved slot portion 32 is defined by a substantially circular, enlarged opening 33 formed in the end face 27. As best shown in FIGURES 4 and 14, the wall 28 of each Z-shaped element 25 has a portion 34 thereof in transverse alignment with a respective slot 29 depressed inwardly and away from a respective end face 27 to provide a substantially L-shaped channel 35Z. Each depressed wall portion 34 is provided with a circular aperture 36 therethrough in axial alignment with the free terminal end of a respective short leg slot portion 31 of the slot 29.

As illustrated in FIGURES 9 and 13, a pivot pin support bracket 37 is fastened to each inwardly facing end surface 14 intermediate the vertical ends thereof by means of a pair of bolts 38 and cooperating lock nuts. Projecting transversely inwardly from the lower end of each bracket 37 is a cylindrical pivot pin 39 which is integrally formed with the bracket 37 and is adapted to project into a respective end of the cylindrical bearing 23. In this manner the end gate is pivotally supported by the body 10 and is swingable about a transversely extending horizontal axis through the pivot pins 39 disposed adjacent the level of the floor 12 between a closed upright vertical position as shown in FIGURE 1 and an open position wherein the end gate hangs vertically downwardly as shown in FIGURE 2.

In order to support the end gate 19 in its opened, rearwardly extending horizontal position, as shown in FIGURE 3, a pair of articulated link means 40 are employed. Each articulated link means 40 includes a link 41 having one end pivotally connected to a respective end of a link 42 by means of a pivot pin 43 as illustrated in FIGURE 12. The links 41 and 42 are of substantially the same length and the end 44 of each link 41 remote from the pivot pin 43 is offset and lies in a plane spaced from the general plane of the link 41 a distance substantially equal to spacing of the vertical planes containing the inwardly facing end surface 14 and the depressed area 18. The articulated link means 40 is pivotally connected to the body 10 by means of a bolt 45 adapted to extend loosely through an aperture 46 formed in the offset portion 44 and be threaded into a nut 47 welded to the concealed side of the sheet metal forming the depressed area 18, as shown in FIGURES 6, 7 and 8.

Referring to FIGURES 11 and 14, it will be noted that a pin 49 is rigidly secured to the end of each link 42 remote from the pivot pin 43. The pins 49 project transversely inwardly and are adapted to extend through the slots 29 formed in the end faces 27 of the end gate 19. Each pin 49 is provided with a radial shoulder 50. A helically wound compression spring 51 encircles each pin 49 and is disposed between a respective shoulder 50 and the end portion of the pin attached to the link 42. One end of the spring 51 bears against a cup-shaped spring retainer 52 slidably mounted on the pin 49 which in turn is adapted to bear against the shoulder 50. The opposite end of each spring 51 reacts against a spring retainer 53 which is also slidably mounted on the pin 49. In order to attach the articulated link means 40 to the end gate 19 each pair of pivotally connected links 41, 42 is oriented until the pin 49 and the spring 51 and spring retainers 52 and 53 carried thereby are in alignment with an opening 33 formed in a respective end face 27. The diameters of the openings 33 are of a size to permit the shoulders 50, spring retainers 52, 53 and spring 51 to pass through the end walls 27 to the end gate 19. However, the width of each elongated slot is only slightly larger than the diameter of the pins 49 and considerably smaller than the diameter of the spring retainer 53. Thus when the articulated link means 40 are properly attached to the end gate 19, each spring retainer 53 is resiliently urged into abutting engagement with the concealed surface of a respective end face 27 by the spring 51 associated therewith. From the foregoing it will be appreciated that the pin and slot connection between the link means 40 and the end gate 19 is maintained in all positions of the end gate 19 with respect to the vehicle body and the link means 40 can only be detached from the end gate 19 when the pins 49 are in registration with the enlarged openings 33 in the end gate end walls 27. In operation, as the end gate 19 is moved between its opened, horizontal rearwardly extending position, as shown in FIGURE 3, and its opened vertical position shown in FIGURE 2, the pins 49 are disposed in the relatively long leg slot sections 30 and slide along the longitudinal axes of the slot sections 30 with respect to the end gate 19. It is to be understood that the length of the articulated link means 40 when links 41, 42 thereof are arranged end to end is considerably greater than the vertical distance between the pivot pins 45 and the openings 33 in the end wall 27 when the end gate 19 is in its vertically downwardly hanging position as shown in FIGURE 2, and hence during normal swinging of the end gate 19 between the position shown in FIGURE 1 and FIGURE 2 the pins 49 are never in alignment with the openings 33 and the link means 40 cannot, therefore, be inadvertently disconnected from the end gate 19. Each pin 49 includes a projection 54 which extends axially from the radial shoulder 50. The tip 55 of each projection 54 is adapted to slidingly engage the bottom of the L-shaped channel 35, as shown in FIGURES 6, and the pins 4 are guided by the slot sections 30 during movement of the end gate 19 between the positions shown in FIGURES 3 and 2.

During normal operation of the end gate 19 the pins 49 are disposed within the short leg slot sections 31 and engage the closed ends of such slot sections 31. The projections 54 are in alignment with the apertures 36 formed in the depressed wall portions 34 and, as a result of the resilient action of the springs 51, the pin projections 54 are caused to enter the apertures 36, as shown in FIGURE 14. It will be noted that the shoulders 50 of the pins 49 are of a greater diameter than the apertures 36 and bear against the bottom of the channels 35 when the projections 54 extend through the apertures 36. From the foregoing it will be appreciated that a simple but effective detent means is thus provided for releasably connecting one end of each of the articulated link means 40 to the end gate 19 whereby the end gate 19 is supported in its opened rearwardly extending position, as shown in FIGURE 2, but which may be quickly and easily released by merely withdrawing the pin projections 54 axially or laterally outwardly from the apertures 36 to permit the end gate to swing from its rearwardly extending position to its vertically downwardly hanging position. As the end gate 19 is swung from its opened rearwardly extending position to its closed or upright position each pair of links 41, 42 are foldable into overlapping relationship adjacent the inwardly facing end surfaces 14, as shown in FIGURE 10. To insure that each pair of links 41 and 42 always fold into overlapping relationship alongside the end faces 14 as the end gate 19 is raised a helically wound spring 56 is mounted on each bolt 45 intermediate the surface 18 and a respective offset portion 44. Each spring 56 has its ends defined by elongated legs 57, 58. The leg 57 of each spring 56 is provided with a lateral extension which is adapted to be inserted in a small opening through a respective surface 18. The free end of the leg 58 of each spring 56 is defined by a hook shaped portion 59 which is adapted to frictionally engage a respective link 41. Inasmuch as the legs 57 are anchored to the surfaces 18 and since the legs 58 engage the tops of links 41 as viewed in FIGURE 3 and the points of engagement are radially spaced from the bolts 45 the biasing action of the springs 56 is such that it tends to yieldably urge the pivot pins 43 in a clockwise direction as viewed in FIGURE 3. Thus whenever the end gate 19 is raised from the position shown in FIGURE 3 the springs 56 yieldably urge the links 41, 42 to their overlapping relationship.

The transversely spaced edges of the top surface 22 of the end gate 19 are defined by flanges 23 which extend laterally from the end faces 27 of the end gate 19. Each flange 60 merges into one end of a respective flange 61 formed by each pair of V-shaped elements 25 and 26 and projecting substantially perpendicular from a respective end face 27 as shown in FIGURE 14. Thus when the end gate 19 is in its upright or fully closed position as shown in FIGURE 1 the flanges 61 and 60 extend between the end faces 27 of the end gate 19 and the end walls 14 of the rear panel sections 13 and since the links 41 and 42 are disposed between each end wall and the adjacent end wall and the adjacent end face 27 in a folded overlapping relationship the articulated link means 40 are substantially enclosed by the flanges 60, 61 and are protected from dirt, grime and climatic elements.

The embodiment of the invention chosen for the purposes of illustration and description herein is that preferred for achieving the objects of the invention and developing the utility thereof in a most desirable manner due regard being had to existing factors of economy, simplicity of design and construction and the improvements sought to be effected. It will be appreciated therefore that the particular structural and functional aspects emphasized herein are not intended to exclude but rather to suggest such other adaptations and modifications of the invention as fall within the spirit and scope of the invention as defined in the appended claims.

What is claimed is:

1. In a motor vehicle body having an end gate mounted for swinging movement between a closed, vertical upright position, an open, horizontal position, and an open, vertical depending position; end gate support means for supporting said end gate in its open, horizontal position including a first pivot pin and a second pivot pin, said first pivot pin connected to said body, said second pivot pin connected to said end gate and slidable relatively to said end gate between first and second positions corresponding to the closed, vertical upright and open, horizontal positions and the open, vertical depending position, respectively, of said end gate and releasable lock means for securing said second pivot pin to said end gate in its first position and prevent relative sliding movement between said second pivot pin and end gate.

2. In a motor vehicle body having an end gate mounted for substantially 180° swinging movement between a closed, vertical upright position, an open, horizontal position, and an open, vertical depending position; end gate support means including articulated link means having a first pivot pin on one end connected to the body and a second pivot pin on the other end connected to said end gate and slidable relatively to said end gate between first and second positions corresponding to the closed, vertical upright and open, horizontal positions and the open vertical depending position, respectively, of said end gate, and releasable lock means for securing said second pivot pin to said end gate in its first position and prevent relative sliding movement between said second pivot pin and end gate.

3. In a motor vehicle body having a rectangular end gate mounted thereon for swinging movement about a horizontal axis between a closed, vertical upright position, an open, horizontal position, and an open, vertical depending position; end gate support means including articulated link means having a first pivot pin on one end connected to said body at a point radially spaced from said axis and a second pivot pin on the other end connected to said end gate and slidable relatively to said end gate; along a line extending substantially radially with respect to said axis between first and second positions corresponding to the closed, vertical upright and open, horizontal positions and the open, vertical depending position, respectively, of said end gate; and releasable lock means for securing said second pivot pin to said end gate in its first position and prevent relative sliding movement between said second pivot pin and end gate.

4. In a motor vehicle body, having a rectangular end gate mounted thereon for swinging movement about a horizontal axis between a closed, vertical upright position, an open, horizontal position, and an open, vertical depending position; end gate support means including a pair of articulated links having an end provided with a first pivot pin connected to said body at a point radially spaced from said axis and the other end provided with a second pivot pin connected to said end gate and slidable relatively to said end gate; along a line extending substantially radially with respect to said axis between first and second positions corresponding to the closed, vertical upright and open, horizontal positions and the open, vertical depending position, respectively of said end gate; and releasable lock means for securing said second pivot pin to said end gate in its first position and prevent relative sliding movement between said second pivot pin and said end gate.

5. In a motor vehicle body substantially as set forth in claim 4, further including biasing means for resiliently urging said articulated links to a position wherein the pivotal connection between said articulated links is substantially in vertical alignment with said first pivot pin.

6. In a motor vehicle body having a rectangular end gate mounted thereon for swinging movement about a horizontal axis between a closed, vertical upright position, an open, horizontal position, and an open, vertical depending position; end gate support means including a pair of articulated links having an end provided with a first pivot pin connected to said body at a point radially spaced from said axis and the opposite end provided with a second pivot pin connected to said end gate and slidable relatively to said end gate; along a line extending substantially radially with respect to said axis, said second pin operatively engaging and cooperable with elongated track means carried by said end gate and being movable between a first position adjacent one end of said track means corresponding to the closed, vertical upright and open, horizontal positions of said end gate and a second position adjacent the opposite end of said track means corresponding to the open, vertical depending position of said end gate; and releasable lock means cooperable with said second pin for securing said second pin to said end gate in its first position to prevent relative sliding movement of said second pin along said track means.

7. In a motor vehicle body having a rectangular end gate mounted thereon for swinging movement about a horizontal axis extending transversely with respect to the body and through one edge of said end gate between a closed, vertical upright position, an open, horizontal position, and an open, vertical depending position; end gate support means including a pair of articulated links having an end provided with a first pivot pin connected to said body at a point radially spaced from said axis; track means carried by said end gate along a side edge thereof, said track means lying in a vertical plane and extending generally radially with respect to said axis; means interconnecting the end of said links opposite end thereof connected to said body to said track means including a second pivot pin carried by said articulated links operatively engaging said track means for relative sliding movement, the longitudinal axis of said second pivot pin extending horizontally and parallel to the pivotal axis of said end gate, said second pin being slidably movable between a first position adjacent the end of said track means remote from said pivotal axis of said end gate corresponding to the closed, vertical upright and open, horizontal positions of said end gate and a second position adjacent the opposite end of said track means corresponding to the open, vertical depending position of said end gate; and releasable lock means cooperable with said second pivot pin for securing said second pivot pin to said end gate in its first position to prevent relative sliding movement of said pin along said track means.

8. In a motor vehicle body having a rectangular end gate mounted thereon for swinging movement about a horizontal axis extending transversely of the body and through one edge of said end gate between a closed, vertical upright position, an open, horizontal position, and an open vertical depending position, each transverse end of said end gate having a flat wall disposed in a vertical plane perpendicular to said axis; track means including an elongated slot formed through each of said flat walls, said slots extending generally radially with respect to said axis; end gate support means including two pairs of articulated links, one end of each pair of links being provided with a first pivot pin connected to said body at a point radially spaced from said axis; means interconnecting the opposite ends of said pairs of links to said track means including a second pivot pin carried by each of said pairs of links extending through a respective slot and adapted to slide relatively to said end gate, said second pin being slidably movable between a first position adjacent the end of said slot remote from said pivotal axis of said end gate corresponding to the closed, vertical upright and open, horizontal positions of said end gate and a second position adjacent the opposite end of said slot corresponding to the open, vertical depending position of said end gate; and releasable lock means cooperable with said second pivot pins for securing said second pivot pins to said end gate in their first positions to prevent relative sliding movement of said second pivot pins along said slots toward their second positions.

9. In a motor vehicle body substantially as set forth in claim 8, wherein said articulated links are movable between a folded overlapping position corresponding to the closed vertical upright position of said end gate and an extended end-to-end position corresponding to the open horizontal rearwardly extending position of said end gate; and biasing means for each pair of articulated links, each of said biasing means yieldably urging a respective pair of links toward their folded overlapping position.

10. In a motor vehicle body having a rectangular end gate mounted thereon for swinging movement about a horizontal axis extending transversely of the body through one edge of said end gate, each transverse end of said end gate being formed to provide an outer wall and an inner wall spaced and parallel thereto, said inner and outer walls being disposed in vertical planes perpendicular to said axis; end gate support means including two pairs of articulated links, each of said links having a first end and a second end, the first end of each pair of links being pivotally connected to said body at a point radially spaced from said axis; track means including an elongated slot formed through each of said outer walls, said slots extending generally radially with respect to said axis, said track means further including a transversely inwardly depressed surface portion of each of said inner walls, each of said depressed surface portions being in registration with a respective slot; means interconnecting the second end of each pair of links to said track means for relative sliding movement including a pin carried by each of said pairs of links extending through a respective slot and adapted to slidingly engage a respective depressed surface portion, and releasable lock means including said pins for securing said pairs of articulated links to said end gate adjacent the ends of said slots remote from said axis to prevent relative sliding movement of said pins along said slots.

11. In a motor vehicle having a rectangular end gate mounted thereon for swinging movement about a horizontal axis extending transversely of the body through one edge of said end gate, each transverse end of said end gate being formed to provide an outer wall and an inner wall spaced and parallel thereto, said inner and outer walls being disposed in vertical planes perpendicular to said axis; end gate support means including two pairs of articulated links, each of said links having a first end and a second end, the first end of each pair of links being pivotally connected to said body at a point radially spaced from said axis; track means including an elongated slot formed through each of said outer walls, said slots extending generally radially with respect to said axis, said track means further including a transversely inwardly depressed surface portion of each of said inner walls, each of said depressed surface portions being in registration with a respective slot; means interconnecting the second end of each pair of links to said track means for relative sliding movement including a pin carried by each of said pairs of links extending through a respective slot and adapted to slidingly engage a respective depressed surface portion; and releasable lock means including said pins for securing said pairs of articulated links to said end gate adjacent the ends of said slots remote from said axis to prevent relative sliding movement of said pins along said slots, said releasable lock means further including a relatively short slot formed through each of said outer walls and extending substantially at right angles to and from one end of the elongated slot formed therethrough, each of said short slots being adapted to receive a respective pin therein, and an opening in each inner wall in registration with the free end of a respective short slot, an end portion of each pin being adapted to extend through one of said openings when disposed within the free end of a respective short slot.

12. In a motor vehicle substantially as set forth in claim 11, wherein said releasable lock means further includes a helical wound compression spring encircling each of said pin sand disposed between a respective pair of inner and outer walls, each of said springs reacting against a respective pin and outer wall to continually urge the pin inwardly towards the inner wall associated therewith, said springs being effective to yieldably maintain the end portions of said pins in said openings when said pins are disposed within the free ends of said short slots.

13. In a motor vehicle having a rectangular end gate mounted thereon for swinging movement about a horizontal axis extending transversely of the body through one edge of said end gate, each transverse end of said end gate being formed to provide an outer wall and an inner wall spaced and parallel thereto, said inner and outer walls being disposed in vertical planes perpendicular to said axis; end gate support means including two pairs of articulate links, each of said links having a first end and a second end, the first end of each pair of links being pivotally connected to said body at a point radially spaced from said axis; track means including an elongated slot formed through each of said outer walls, said slots extending generally radially with respect to said axis; means interconnecting the second end of each pair of links to said track means for relative sliding movement including a pin carried by each of said pairs of links having a longitudinal axis parallel to the pivotal axis of said end gate, each of said pins extending through a respective slot; and releasable lock means including said pins for securing said pairs of articulated links to said end gate adjacent the ends of said slot remote from said pivotal axis of said end gate to prevent relative sliding movement of said pins along said slots, said releasable lock means further including an opening in each of said inner walls adapted to receive the end portion of a respective pin, and spring means carried by said pins for continually biasing said pins inwardly along their longitudinal axes.

14. In a motor vehicle having a rectangular end gate mounted thereon for swinging movement about a horizontal axis extending transversely of the body through one edge of said end gate between a closed, vertical upright position, an open, horizontal position, and an open, vertical depending position, each transverse end of said end gate having a flat wall disposed in a vertical plane perpendicular to said axis; track means including an elongated slot formed through each of said flat walls, said slots extending generally radially with respect to said axis; end gate support means including two pairs of links, each pair of links including two links of substantially the same length, one end of one link of each pair of links being provided with a first pivot pin connected to said body at a point radially spaced from said axis and the other end of said link being pivotally connected to one end of the other link of said pair of links, each pair of links being movable between a folded overlapping position corresponding to the closed, vertical upright position of said end gate and wherein the links lie substantially in a vertical transversely extending plane and an end-to-end position corresponding to the open, horizontal and open, vertical depending positions of said end gate; means interconnecting each pair of links to said track means including a second pivot pin carried by each of said pairs of links extending through a respective slot and adapted to slide relatively to said end gate, said second pins being slidably movable between a first position adjacent the end of said slot remote from said pivotal axis of said end gate corresponding to the closed, vertical upright and open, horizontal position of said end gate and a second position adjacent the opposite end of said slot corresponding to the open, vertical depending position of said end gate; releasable lock means cooperable with said second pivot pins for securing said second pivot pins to said end gate in their first positions to prevent relative sliding movement of said second pivot pins along said slots toward their second positions; and biasing means for each pair of links for yieldably urging the link thereof pivotally connected to the body to the position assumed thereby when said links are in their folded overlapping position.

References Cited in the file of this patent

UNITED STATES PATENTS

| | | |
|---|---|---|
| 2,364,648 | Olson | Dec. 12, 1944 |
| 2,699,352 | Matthew | Jan. 11, 1955 |